United States Patent
Shental et al.

(10) Patent No.: US 8,774,294 B2
(45) Date of Patent: Jul. 8, 2014

(54) COMPRESSED SENSING CHANNEL ESTIMATION IN OFDM COMMUNICATION SYSTEMS

(75) Inventors: Ori Shental, Haifa (IL); Alecsander P. Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 532 days.

(21) Appl. No.: 12/768,540

(22) Filed: Apr. 27, 2010

(65) Prior Publication Data

US 2011/0261905 A1  Oct. 27, 2011

(51) Int. Cl.
*H04L 27/28* (2006.01)

(52) U.S. Cl.
USPC ........................................................ 375/260

(58) Field of Classification Search
USPC ......... 375/130, 219, 229, 260, 295, 308, 316, 375/340
See application file for complete search history.

(56) References Cited

U.S. PATENT DOCUMENTS

| | | | | |
|---|---|---|---|---|
| 7,609,786 B2 * | 10/2009 | Keerthi | | 375/340 |
| 2006/0233269 A1 * | 10/2006 | Bhushan et al. | | 375/260 |
| 2008/0084817 A1 * | 4/2008 | Beckman et al. | | 370/210 |
| 2009/0103651 A1 * | 4/2009 | Lahtonen et al. | | 375/308 |
| 2009/0225913 A1 * | 9/2009 | Nakahara et al. | | 375/347 |
| 2009/0323790 A1 * | 12/2009 | Yousef | | 375/224 |
| 2010/0203841 A1 * | 8/2010 | Hwang et al. | | 455/67.14 |

OTHER PUBLICATIONS

International Search Report and Written Opinion—PCT/US2011/033096, International Search Authority—European Patent Office—Aug. 10, 2011.
Miosso C J et al: "Compressive Sensing Reconstruction With Prior Information by Iteratively Reweighted Least-Squares", IEEE Transactions on Signal Processing, IEEE Service Center, New York, NY, US, vol. 57, No. 6, Jun. 1, 2009, pp. 2424-2431, XP011253189,.
Taubock, Geog et al: "A compressed sensing technique for OFDM channel estimation in mobile environments: Exploiting channel sparsity for reducing pilots", Acoustics, Speech and Signal Processing, 2008. ICASSP 2008. IEEE International Conference on, IEEE, Piscataway, NJ, USA, Mar. 31, 2008, pp. 2885-2888, XP031251194.

* cited by examiner

*Primary Examiner* — Sam K Ahn
*Assistant Examiner* — Shawkat M Ali
(74) *Attorney, Agent, or Firm* — Fulbright & Jaworski LLP

(57) ABSTRACT

Methods and devices for receiving Orthogonal Frequency Domain Multiplexed (OFDM) wireless signals employ compressed sensing-based estimation techniques, exploiting the common sparseness of the wireless channel, to achieve signal reception in the presence of significant Doppler spread. When implemented for an ISDB-T mobile TV standard signal, the compressed sensing channel estimation algorithm enables data reception in Doppler spread conditions beyond the capabilities of conventional channel estimation methods.

24 Claims, 7 Drawing Sheets

COMPRESSED SENSING CHANNEL ESTIMATION IN OFDM COMMUNICATION SYSTEMS

FIELD OF THE INVENTION

This application relates generally to wireless data communications, and more particularly to improved methods for obtaining channel estimations in OFDM communication systems.

BACKGROUND

Orthogonal frequency-division multiplexing (OFDM) is a wireless data communication technology used in many wireless communications. While OFDM offers a number of performance advantages, such communication links are vulnerable to interference and fading in the presence of significant Doppler shifts. As mobile communication devices, such as mobile TV receivers, are implemented in motor vehicles and aircraft, the challenges to signal reception posed by significant Doppler spread are expected to become a common design challenge.

SUMMARY

A channel estimation method for orthogonal frequency-division multiplexing (OFDM) systems based on the theory of compressed sensing provides an alternative to the classical Shannon-Nyquist sampling theory used in convention OFDM systems. The various embodiments accomplish channel estimation of signals in the delay-Doppler domain which represents an OFDM channel as a sparse signal. This allows for the utilization of compressed sensing for channel estimation which provides performance benefits for fast frequency-selective fading OFDM channels. In a particular embodiment, a compressed sensing channel estimation algorithm is applied in an ISDB-T (Integrated Services Digital Broadcast-Terrestrial) mobile TV system. The compressed sensing channel estimation algorithm significantly outperforms state-of-the-art channel estimation algorithms in terms of maximal attainable Doppler spread. The compressed sensing channel estimation algorithm may be employed to boost equalization performance of existing and future OFDM-based mobile applications.

In an embodiment, a method for receiving a wireless Orthogonal Frequency Division Multiplexing (OFDM) signal includes obtaining a channel estimate using compressed sensing channel estimation. In this method, obtaining a channel estimate using compressed sensing channel estimation may include performing compressed sensing channel estimation on an OFDM signal reconstructed as a sparse signal in a delay-Doppler domain. Alternatively, in the method obtaining a channel estimate using compressed sensing channel estimation may include obtaining pilot signals $g^P$ from the channel using a least-squares estimator, and using the obtained pilot signals to recover a delay-Doppler domain channel vector $\hat{\sigma}$ by solving the following optimization problem $$\min_{\sigma}\|\sigma\|_{l_1} \text{ subject to } g^P = W^P\sigma.$$

In a further embodiment, the method may further include reassigning the recovered delay-Doppler domain channel vector $\hat{\sigma}$ into a cross-domain relation to reveal channel estimate tap locations. In an embodiment the OFDM signals may be ISDB-T signals.

In a further embodiment, a receiver circuit configured to receive wireless Orthogonal Frequency Division Multiplexing (OFDM) signals may include a first processing circuit configured to obtain a channel estimate using compressed sensing channel estimation. In this embodiment, the first processing circuit configured to obtain a channel estimate using compressed sensing channel estimation may include a second processing circuit configured to reconstruct an OFDM signal as a sparse signal in a delay-Doppler domain, and a third processing circuit configure to perform compressed sensing channel estimation the sparse signal in the delay-Doppler domain. In this embodiment, the first processing circuit configured to obtain a channel estimate using compressed sensing channel estimation may include a fourth processing circuit configure to obtain pilot signals $g^P$ from a channel using a least-squares estimator, and a fifth processing circuit configured to use the obtained pilot signals to recover a delay-Doppler domain channel vector $\hat{\sigma}$ by solving the following optimization problem $$\min_{\sigma}\|\sigma\|_{l_1} \text{ subject to } g^P = w^P\sigma.$$

In a further embodiment, the receiver circuit may further include a sixth processing circuit configured to reassign the recovered delay-Doppler domain channel vector $\hat{\sigma}$ into a cross-domain relation to reveal channel estimate tap locations. In a further embodiment, the receiver circuit may be configured to ISDB-T signals.

In a further embodiment, a receiver circuit for receiving wireless Orthogonal Frequency Division Multiplexing (OFDM) signals may include means for obtaining a channel estimate using compressed sensing channel estimation. In this embodiment, the means for obtaining a channel estimate using compressed sensing channel estimation may include means for reconstructing an OFDM signal as a sparse signal in a delay-Doppler domain and means for performing compressed sensing channel estimation the sparse signal in the delay-Doppler domain. Alternatively, in this embodiment the means for obtaining a channel estimate using compressed sensing channel estimation may include means for obtaining pilot signals $g^P$ from the channel using a least-squares estimator, and means for using the obtained pilot signals to recover a delay-Doppler domain channel vector $\hat{\sigma}$ by solving the following optimization problem $$\min_{\sigma}\|\sigma\|_{l_1} \text{ subject to } g^P = w^P\sigma.$$

In a further embodiment, the receiver circuit may further include means for reassigning the recovered delay-Doppler domain channel vector $\hat{\sigma}$ into a cross-domain relation to reveal channel estimate tap locations. In an embodiment the OFDM signals may be ISDB-T signals.

In a further embodiment, a communication device configured to receive wireless Orthogonal Frequency Division Multiplexing (OFDM) signals includes a wireless receiver circuit configured to obtain a channel estimate using compressed sensing channel estimation. In this embodiment, the first processing circuit configured to obtain a channel estimate using compressed sensing channel estimation may include a second processing circuit configured to reconstruct an OFDM signal as a sparse signal in a delay-Doppler domain, and a third processing circuit configure to perform compressed sensing channel estimation the sparse signal in the delay-Doppler domain. In this embodiment, the first processing circuit configured to obtain a channel estimate using compressed sensing channel estimation may include a fourth processing circuit configure to obtain pilot signals $g^P$ from a channel using a least-squares estimator, and a fifth processing circuit configured to use the obtained pilot signals to recover a delay-Doppler domain channel vector $\hat{\sigma}$ by solving the optimization problem $$\min_{\sigma} \|\sigma\|_{l_1} \text{ subject to } g^P = w^P \sigma.$$

In a further embodiment, the communication device may further include a sixth processing circuit configured to reassign the recovered delay-Doppler domain channel vector $\hat{\sigma}$ into a cross-domain relation to reveal channel estimate tap locations. In a further embodiment, the wireless receiver circuit may be configured to receive ISDB-T signals.

In a further embodiment, a communication device configured for receiving wireless Orthogonal Frequency Division Multiplexing (OFDM) signals may include means for obtaining a channel estimate using compressed sensing channel estimation. In this embodiment, the means for obtaining a channel estimate using compressed sensing channel estimation may include means for reconstructing an OFDM signal as a sparse signal in a delay-Doppler domain and means for performing compressed sensing channel estimation the sparse signal in the delay-Doppler domain. Alternatively, in this embodiment the means for obtaining a channel estimate using compressed sensing channel estimation may include means for obtaining pilot signals $g^P$ from the channel using a least-squares estimator, and means for using the obtained pilot signals to recover a delay-Doppler domain channel vector $\hat{\sigma}$ by solving the following optimization problem $$\min_{\sigma} \|\sigma\|_{l_1} \text{ subject to } g^P = w^P \sigma.$$

In a further embodiment, the communication device may further include means for reassigning the recovered delay-Doppler domain channel vector $\hat{\sigma}$ into a cross-domain relation to reveal channel estimate tap locations. In an embodiment the OFDM signals may be ISDB-T signals.

In a further embodiment, a non-transitory processor-readable storage medium may have stored thereon digital signal processor-executable instructions configured to cause a digital signal processor to perform operations including obtaining a channel estimate on a wireless Orthogonal Frequency Division Multiplexing (OFDM) signal using compressed sensing channel estimation. In this embodiment, the stored digital signal processor-executable instructions are configured to cause a digital signal processor to perform operations such that obtaining a channel estimate using compressed sensing channel estimation comprises performing compressed sensing channel estimation on an OFDM signal reconstructed as a sparse signal in a delay-Doppler domain. In this embodiment, the digital signal processor-executable instructions are configured to cause a digital signal processor to perform operations such that obtaining a channel estimate using compressed sensing channel estimation includes obtaining pilot signals $g^P$ from the channel using a least-squares estimator, and using the obtained pilot signals to recover a delay-Doppler domain channel vector $\hat{\sigma}$ by solving the following optimization problem $$\min_{\sigma} \|\sigma\|_{l_1} \text{ subject to } g^P = w^P \sigma.$$

In this embodiment, the stored digital signal processor-executable instructions are configured to cause a digital signal processor to perform operations further comprising reassigning the recovered delay-Doppler domain channel vector $\hat{\sigma}$ into a cross-domain relation to reveal channel estimate tap locations. In this embodiment, the OFDM wireless signals may include ISDB-T signals.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any embodiment described herein as "exemplary" is not necessarily to be construed as preferred or advantageous over other embodiments.

As used herein, the terms "communication device," "receiver device" and "receiver" refer to any one or all of wireless communication devices configured to receive wireless communication signals transmitted in using OFDM encoding and modulation. Such communication devices may include mobile multimedia broadcast receivers, cellular telephones, mobile television devices and similar personal electronic devices which include receiver circuitry capable of demodulating OFDM symbols, and a programmable processor and memory.

The various embodiments provide channel estimation methods for OFDM communication systems based on the theory of compressed sensing (CS). Compressed sensing enables the reconstruction of sparse signals from incomplete sets of measurements, thereby providing an appealing alternative to the classical Shannon-Nyquist sampling theory. In the various embodiments, the analysis of OFDM signals is shifted from the conventional dense time-frequency domain to the sparse delay-Doppler domain in order to represent the OFDM channel as an approximately sparse signal. This method of analysis enables utilization of compressed sensing to accomplish the challenging estimation of OFDM channels in the presence of fast frequency-selective fading. In a particular embodiment, a compressed sensing channel estimation (CSCE) algorithm is applied to the ISDB-T (Integrated Services Digital Broadcast-Terrestrial) mobile TV system. The embodiment compressed sensing channel estimation algorithm has been found to significantly outperform state-of-the-art channel estimation algorithms in terms of maximal attainable Doppler spread, including those implemented in current mobile TV chipsets. The performance of the compressed sensing channel estimation algorithm embodiment substantially exceeds the attainable Doppler spread supported by Nyquist bound and least-squares techniques based on uniform sampling (e.g., up to three times better Doppler spread in certain cases). The compressed sensing channel estimation embodiment may be used to boost equalization performance of existing and future OFDM-based standards for mobile applications.

Figure 1:
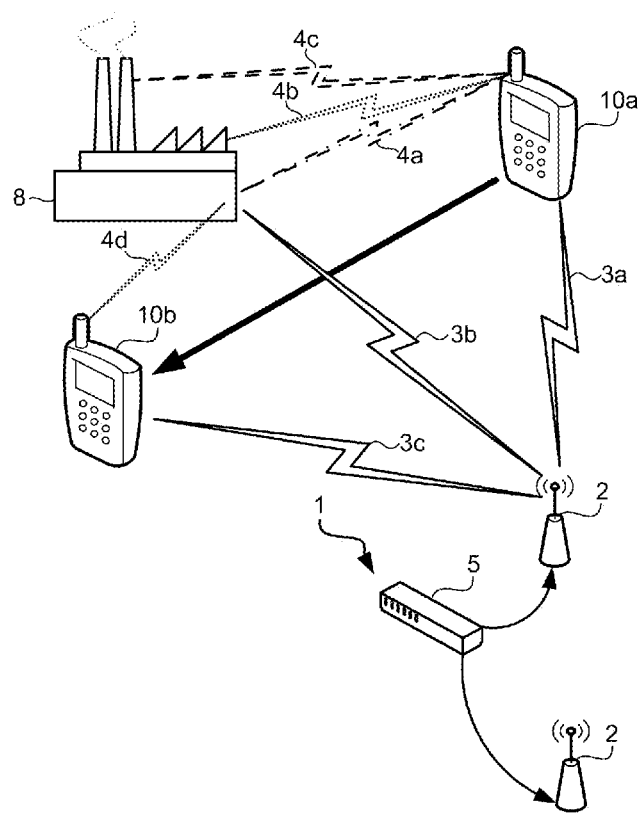
FIG. 1 is a system block diagram of a communication system using orthogonal frequency division multiplexing (OFDM) technology.

An example OFDM communication system is illustrated in FIG. 1. One type of communication system that uses OFDM transmissions is mobile broadcast television. A mobile broadcast television system 1 may include a plurality of transmission towers 2 connected to a broadcast system 5. The transmission towers 2 broadcast radio frequency signals 3a-3c encoded using OFDM techniques for reception by communication devices 10a, 10b.

The problem of channel fading due to multipath interference is illustrated in FIG. 1. A mobile communication device in one location 10a will typically receive broadcast signals via a direct transmission path 3a between the device and the nearest transmission tower 2. The mobile communication device 10a may also receive additional signals 4a, 4b, 4c that have traveled via an indirect path ("multipath") such as may be caused by broadcast signals 3b reflected off of mountains, buildings 8, and other structures.

Since multipath signals 4a, 4b, 4c travel a longer distance, they arrive at the mobile communication device 10a after the direct transmission path signal 3a. The difference in arrival times of direct- and indirect-path signals is referred to as "delay spread." As a result, one or more of the multipath signals 4a, 4b, 4c may destructively interfere with the direct transmission path signal 3a, causing the signal to "fade." Also, delay spread exceeding the sampling rate period can introduce frequency-selectivity. When communication devices are mobile, such as cellular telephones and mobile television receiver devices, the signal fading conditions may change rapidly as the communication device moves about. This is illustrated by the difference in multipath signals received by a mobile communication device in position 10a compared to the multipath signal 4d received by the mobile communication device when it moves position 10b.

In addition to rapid changes in the multipath signal environment which causes rapid changing in fading characteristics, movement of the mobile device causes frequency shifts due to the Doppler effect in both the direct transmission path signal 3a and the multipath signals 4a, 4b, 4c, 4d. Since the movement of a communication device 10a with respect to transmission towers 2 and with respect to reflection sources such as building 8 will typically be different, the Doppler frequency shift in the direct transmission path signal 3a will typically be different than that of multipath signals 4a, 4b, 4c, 4d. The difference in Doppler frequency shift between direct path and multipath signals is referred to as "Doppler spread." The temporal channel variations arising from Doppler spread gives rise to time-selectivity.

The combination of multipath delay and Doppler spread gives rise to time-frequency selectivity, which can cause delay-Doppler fading, or doubly selective fading in channels. Rapidly changing multipath and Doppler spread conditions can complicate the accurate identification and decoding of OFDM signals for doubly selective fading channels.

Channel estimation is a crucial and challenging task in the equalization of OFDM transmission over doubly-selective fading channels. For doubly-selective fading, the filter taps which characterize the frequency selectivity of the channel due to long multipath delay from surrounding scatterers tend to also change very rapidly in time. This is a common fading scenario in mobile applications of OFDM technology (e.g., LTE and WiMAX) as illustrated in FIG. 1.

Channel estimation in OFDM can be viewed as a two-dimensional signal interpolation problem. Complex channel gains corresponding to data-carrying frequency subcarriers in a certain timeframe which may be interpolated (in time and frequency) based on given pilot-carrying subcarriers. The Nyquist bound corresponding to uniform sampling and reconstruction of the signal is determined by the channel's delay spread and Doppler spread. Typically, in order to maintain the overall throughput, the amount of available pilots is limited, thus often (e.g., for high level of mobility, high center frequencies) the number of pilots in a signal falls below the number of samples required for perfect reconstruction.

The vast majority of channel estimation algorithms in use or described in the literature are based on a least-squares (LS)/minimum mean-square error (MMSE) optimization of the uniform samples set. An example of such a method for channel estimation in DVB-H (Digital Video Broadcasting for Handheld devices) and ISDB-T (Integrated Services Digital Broadcast-Terrestrial) is termed "CE." The CE method is disclosed in U.S. Patent Application Publication No. 2008/0084817 entitled "Channel Estimation For Multi-Carrier Communication" dated Apr. 10, 2008, the entire contents of which are hereby incorporated by reference. In CE, a MMSE interpolation in time of the scattered pilots is performed first, providing the extra reliable samples required for perfect reconstruction of the channel in the frequency domain. This method obeys the Shannon-Nyquist sampling theory, hence it is limited to relatively low and intermediate Doppler spreads. In cases of small enough delay spreads (i.e., the channel's spectrum is flat enough with respect to the number of given pilots), a one-dimensional interpolation in the frequency domain suffices, regardless of the Doppler spread.

Higher Doppler spreads can be handled within the Shannon-Nyquist paradigm by wise manipulation of the aliased signal via subsampling. An example of this is the recently-derived CEZF algorithm (which stands for CE with subsampling) which is disclosed in U.S. Provisional Patent Application No. 61/232,279 entitled "Channel Estimations Using Replicas Zero Forcing" filed Aug. 7, 2009, the entire contents of which are hereby incorporated by reference. High Doppler performance may also be accomplished using a continuous pilot channel estimation (CPCE) algorithm, which is disclosed in U.S. Patent Application Publication No. 2008/0084817 incorporated by reference above. The CPCE algorithm exploits the irregularly spaced continuous pilot symbols included in DVB-H broadcast signals. However, the CPCE algorithm is not applicable for ISDB-T broadcast signals because ISDB-T signals lack sufficient continuous pilot symbols.

The various embodiments cope with high Doppler spreads and large delay spreads by taking a completely different approach to signal analysis compared to the conventional framework of Shannon-Nyquist sampling theory. Typically, the channel impulse response in wireless applications is (approximately) sparse, that is, the absolute value of only a small fraction of the channel taps actually exceeds a certain low threshold, while the rest of the taps are equal or very close to zero. Taking into account the sparseness of the channel allows circumventing the inherent limitations of Shannon-Nyquist theory, which deals with any arbitrary, possibly dense signal. The various embodiments make use of the channel sparseness to use compressed sensing methods for channel estimation.

Compressed sensing is an attractive technique for reconstructing a signal from a reduced set of linear measurements utilizing the side information that the signal is sparse or compressible. The compressibility of a signal emerges, in particular, if it can be represented as a sparse signal in some other domain. Such a sparse signal appears when recasting the OFDM signal from the traditional time-frequency domain into the delay-Doppler domain. Hence, the channel estimation problem can be reformulated as reconstructing a sparse signal in the delay-Doppler domain from given measurements taken from a partial set of pilots in the time-frequency domain. Based on this observation, a compressed sensing channel estimation method can be utilized for OFDM signals, such as ISDB-T signals, with superior estimation-error performance.

The following notations are used herein. The entries of vector x and matrix X are denoted by $x_i$ and $X_{ij}$, respectively. The conjugate-transpose of a vector or matrix is denoted by the superscript T, while modulo-K operation is denoted by $(\cdot)_K$. The symbol $\otimes$ denotes Kronecker product, and $\|\cdot\|_{l_2}$ is the $l_2$-norm (Euclidean norm).

Figure 2:
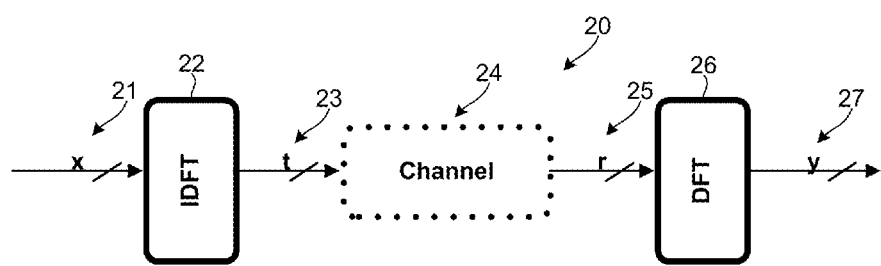
FIG. 2 is a circuit block diagram of circuit components for receiving OFDM signals.

A typical OFDM transceiver circuit 20 is illustrated in FIG. 2. In an OFDM transceiver circuit 20, the incoming signals 21 are processed in an inverse discrete Fourier transform (IDFT) circuit 22 to produce discrete-time signals 23 that can be processed in a channel 24, the output 25 of which is processed in a discrete Fourier transform (DFT) circuit 26 to produce a received signal 27 in the symbol-frequency domain. Such an OFDM system may have K subcarriers transmitting a block of L symbols. Each symbol consists of N≥K samples, thus the cyclic prefix (CP) includes C=N−K samples.

The discrete-time transmit signal vector per transmission block, $t \equiv [t_0, \ldots, t_n, \ldots, t_{NL-1}]^T$, probed at the output of the inverse discrete Fourier transform (IDFT) operation 22, is given by (including the CP)

$$t_n = \frac{1}{K} \sum_{l=0}^{L-1} \sum_{k=0}^{K-1} x_k^l \exp\left(2\pi j \frac{k}{K}(n-Nl)\right) \alpha(n-Nl), \quad (1)$$

where $x^l = [x_0^l, \ldots, x_k^l, \ldots, x_{K-1}^l]^T$ is the K-length (coded) information vector, at the input to the IDFT operator, to be conveyed over the l'th symbol. The function $\alpha(n)$ is 1 on [0, N−1] and 0 otherwise. Note that $l=0, \ldots, L-1$ is the running symbol index. In this analysis, the DFT size is taken, without loss of generality, to be K, although typically some subcarriers on the band's edges are arbitrarily set to zero, thus the DFT size, in practice, may differ from the number of subcarriers.

The noiseless discrete-time received signal per block, $r \equiv [r_0, \ldots, r_n, \ldots, r_{NL-1}]^T$, may be expressed by $$r_n = \sum_{m=0}^{C-1} h_m^n t_{n-m}, \quad (2)$$

where $h^n = [h_0^n, \ldots, h_m^n, \ldots, h_{C-1}^n]^T$ is the C-length complex gain impulse response of the fading channel at time instance n. In this analysis, the OFDM system is assumed to be protected from the effect of inter-symbol interference by the use of a cyclic prefix (CP). Hence, the maximal number of channel filter taps is implicitly assumed to be upper bounded by the length C of the CP.

The m'th tap, $h_m^n$, may vary rapidly in time (i.e., within symbol period) due to Doppler spreads. The noiseless K-length received signal vector in the symbol-frequency domain, $y^l \equiv [y_0^l, \ldots, y_k^l, \ldots, y_{K-1}^l]^T$, at the output of the discrete Fourier transform (DFT), is $$y_k^l = \sum_{n=0}^{NL-1} r_n \exp\left(-2\pi j \frac{k}{K}(n-Nl)\right) \beta(n-Nl), \quad (3)$$

where the function β(n), removing the effect of CP, gives 1 on [N−K, N−1] and 0 otherwise.

In an alternative representation, the noisy OFDM signal at symbol l (without CP) can be rewritten in a vector-matrix form as the linear system $$y^l = G^l x^l + n^l, \quad (4)$$

where $n^l = [n_0^l, \ldots, n_k^l, \ldots, n_{K-1}^l]^T$ is the K-length frequency-domain noise vector. The K×K matrix $G^l$ denotes the frequency-domain channel transfer function given by $$G^l = F H^l F^T, \quad (5)$$

where F is the K-point DFT matrix and H is the K×K time-domain channel matrix with entries $H_{xy} = h_{(x-y)_K}^x$. The modulo-K operation takes into account the wrap-around effect of appending a CP.

For time-invariant channels (invariant over at least a single OFDM symbol), as happens for zero Doppler spread, the matrix H is, by definition, circulant. Thus, the characteristics of Fourier transform will result in the overall system matrix G being diagonal, which is one of the key features of OFDM transmission. Hence, for this orthogonal case of a slow frequency-selective fading channel, a simple one-tap (LS, a.k.a. zero-forcing) equalizer suffices to well-estimate the k'th entry of the transmitted vector $$\hat{x}_k^l = \frac{y_k^l}{G_{kk}^l}. \quad (6)$$

However, in a fast fading time-varying channel the matrix H is no longer circulant, thus the system matrix G is not diagonal anymore, breaking the appealing orthogonality of OFDM. A point-wise representation of (4) yields $$y_k^l = G_{kk}^l x_k^l + \sum_{m \neq k} G_{km}^l x_m^l + n_k^l, \quad (7)$$

where the summation term is commonly referred to as inter-carrier interference (ICI).

Typically for OFDM transmissions over doubly-selective channels, the receiver implements two main conceptual procedures: channel estimation and equalization. In the latter procedure, the detrimental effect of inter-carrier interference (i.e., the appearance of off-diagonal terms in G) is mitigated followed by demodulation. This stage can be activated only based on a reliable estimation of the channel, or more precisely, inferring the complex diagonal entries of $G_{kk}$.

As noted above, in non-blind (i.e., pilot-aided) channel estimation, this stage may be accomplished by interpolating between the channel's complex gains corresponding to pre-determined pilot-carrying frequency subcarriers. The various embodiments address this challenging interpolation problem for channel estimation.

The conventional symbol-frequency OFDM channel (4) can be reformulated to have a sparse representation. This can be accomplished by expressing the intuitive time-delay channel response, $h_m^n$, via the delay-Doppler spreading function, $s^m \equiv [s_0^m, \ldots, s_i^m, \ldots s_{NL-1}^m]^T$, to yield $$h_m^n = \frac{1}{NL} \sum_{i=0}^{NL-1} s_i^m \exp\left(2\pi j n \frac{i}{NL}\right). \quad (8)$$

The delay-Doppler function, $s_i^m$, is the outcome of nothing but having a Fourier transform operation over the sequence of the m'th channel tap recorded throughout the entire NL-length transmission block.

Substituting this new channel formulation (8) into the received signal (2), and substituting the result, along with the transmitted vector (1), into the received signal (3), yields the following expression for the received signal corresponding to subcarrier k' at the l'th symbol $$y_{k'}^l = \frac{1}{NL \cdot K} \sum_{n=0}^{NL-1} \exp\left(-2\pi j \frac{k'}{K}(n-Nl')\right) \times \quad (9)$$

$$\sum_{m=0}^{C-1} \sum_{i=0}^{NL-1} s_i^m \exp\left(2\pi j n \frac{i}{NL}\right) \times \sum_{l=0}^{L-1} \sum_{k=0}^{K-1} x_k^l \exp$$

$$\left(2\pi j \frac{k}{K}(n-m-Nl)\right) \times \alpha(n-m-lN)\beta(n-Nl')$$

The overall system in the symbol-frequency domain (4) can be rewritten for the noiseless case in the following scalar manner $$y_{k'}^l = \sum_{k=0}^{K-1} G_{k'k}^l x_k^l. \quad (10)$$

Hence comparing equations (10) to (9), the relation between the symbol-frequency representation of the system and its delay-Doppler counterpart is revealed as $$G_{k'k}^l = \frac{1}{NL \cdot K} \sum_{n=-Nl}^{N(L-l)-1} \exp\left(-2\pi j \frac{n}{K}(k'-k)\right) \times \quad (11)$$

$$\sum_{m=0}^{C-1} \sum_{i=0}^{NL-1} s_i^m \exp\left(2\pi j i \left(\frac{n}{NL} + \frac{l}{L}\right)\right) \times \exp\left(-2\pi j m \frac{k}{K}\right) \alpha(n-m)\beta(n)$$

For purposes of OFDM communications, the embodiment methods focus on estimating the diagonal terms $G_{kk}$, therefore setting k'=k in (11)

$$G_{kk}^l = \sum_{m=0}^{C-1} \sum_{i=0}^{NL-1} s_i^m \exp\left(2\pi j i \frac{l}{L}\right) \exp\left(-2\pi j m \frac{k}{K}\right) \times \quad (12)$$

$$\sum_{n=C}^{N-1} \exp\left(2\pi j i \frac{n}{NL}\right) \frac{1}{NL \cdot K}$$

$$= \frac{1}{\sqrt{L \cdot K}} \sum_{m=0}^{C-1} \sum_{i=0}^{L-1} \exp\left(2\pi j i \frac{l}{L}\right) \exp\left(-2\pi j m \frac{k}{K}\right) \times$$

$$\underbrace{\frac{1}{N\sqrt{L \cdot K}} \sum_{p=0}^{N-1} s_{pL+i}^m \sum_{n=C}^{N-1} \exp\left(2\pi j \left(\frac{pn}{N} + \frac{in}{NL}\right)\right)}_{\sigma_i^m}$$

where the last step is achieved by rescaling the summation index i=0 ... NL−1 to i→i+pL with i=0 ... L−1 and p=0 ... N−1.

To conclude, denoting the double summation on the last line of (12) as $\sigma_i^m$, yields the following useful cross-domain relation $$G_{kk}^l = \sqrt{\frac{L}{K}} (IDFT^{(i)}(DFT^{(m)}(\sigma_i^m))), \quad (13)$$

where the superscript in DFT/IDFT denotes the domain (either delay or Doppler) in which the Fourier transform is performed. This key relation can equivalently be rewritten as the set of linear equations $$g = W\sigma, \quad (14)$$

with
$g \equiv [G_{00}^0, \ldots, G_{00}^{L-1}, \ldots, G_{kk}^0, \ldots, G_{kk}^{L-1}, \ldots, G_{KK}^0, \ldots G_{KK}^{L-1}]^T$ and $\sigma \equiv [\sigma_0^0, \ldots, \sigma_{L-1}^0, \ldots, \sigma_0^m, \ldots \sigma_{L-1}^m, \ldots, \sigma_0^{C-1}, \ldots, \sigma_{L-1}^{C-1}]^T$. The entries of the LK×LC matrix W are given by the matrix Kronecker product $$W^{K \times C} \otimes W^{L \times L} \quad (15)$$

where these matrices are the orthonormal DFT matrices with entries $$W_{li}^{L \times L} = \frac{1}{\sqrt{L}} \exp\left(2\pi j i \frac{l}{L}\right) \quad (16)$$

$$W_{km}^{K \times C} \equiv \frac{1}{\sqrt{K}} \exp\left(-2\pi j m \frac{k}{K}\right)$$

Note that while the vectors g and σ may vary every block, the matrix W is fixed and may be computed only once and stored in memory.

In pilot-aided channel estimation only a small part of the entries of the vector g may be known to the receiver (i.e., via pilot tones) and the embodiment methods deduce the rest of the entries (the data tones). If it is assumed that p out of the total LK subcarriers are pilots, then the P-length measurements vector can be denoted as $g^p$ to yield $$g^p = W^p \sigma, \quad (17)$$

where the P rows of $W^p$ are taken from the corresponding LK rows of W. In order to keep the orthonormality property also to $W^p$, a property which will subsequently be shown very useful, both $W^p$ and $g^p$ may be rescaled by $\sqrt{LK/P}$. The unknown vector $\sigma$ is a sparse vector based on the common observation that only S out of C taps are nonzero (or exceed a certain low threshold) (i.e., S is the number of non-zero channel taps), and S<<C. In this case only SL<<CL entries of $\sigma$ are significant. This sparse representation (17) is the main incentive for the utilization of sparse signal reconstruction techniques like compressed sensing.

In an implementation in which $v_0 \in R^n$ is an (approximately) S-sparse vector, meaning it has only a small number S of its n components being nonzero (or exceeds a small threshold), one would like to acquire $v_0$ from only m<<n linear measurements of $v_0$. Hence, the embodiments solve an underdetermined linear system with m measurements and n unknowns expressed as $$\Phi^{m \times n} v^{n \times 1} = \xi^{m \times 1}. \quad (18)$$

In general, this linear system has an infinite number of valid (possibly dense) solutions. The main claim of compressed sensing theory is that there is a unique one-to-one mapping between the sparse vector $v_0$ and the measurements vector $\xi$, and therefore under the prior knowledge about its sparseness, the linear system (18) is solvable. The following paragraphs explain the origins of this central proposition.

Assume that the mixing (sensing) matrix $\Phi$ obeys what is known as the uniform uncertainty principle (UUP), which is also known as the restricted isometry property (RIP). The uniform uncertainty principle states that for any S-sparse vector h, the energy of the measurements vector $\Phi h$ is comparable to the energy of h itself $$(1-\delta_S)\frac{m}{n}\|h\|_{l_2}^2 \leq \|\Phi h\|_{l_2}^2 \leq (1+\delta_S)\frac{m}{n}\|h\|_{l_2}^2, \quad (19)$$

where $\delta_S$ is not too close to one. Note that while h is entirely concentrated on a small set, it is spread out more or less evenly in the measurements domain, meaning that calculation reveals something new about the sparse vector with every new measurement. This is in sharp contrast to Shannon sampling of sparse signals in which most of the samples will result in (information-less) zeros.

The importance of this principle to sparse recovery is in the observation that there is no other S-sparse (or sparser) vector h' that has the same measurements, since otherwise $\Phi(h-h')=0$ and (h-h') is (at most) 2S-sparse vector, making these two properties incompatible under the uniform uncertainty principle.

It is known that if the sensing matrix $\Phi$ is a partial Fourier matrix, as in equation (17), obtained by selecting m rows uniformly at random, and renormalizing the columns so that they are unit-normed (as in equation 17), then the uniform uncertainty principle holds with overwhelming probability if $$m \geq S \log n. \quad (20)$$

Hence, the sparse vector $v_0$ can be recovered by finding the sparsest vector solving the linear system for the given measurements. This can be done by solving the optimization problem $$\min_v \#\{i : v_i \neq 0\} \text{ subject to } \Phi v = \xi, \quad (21)$$

where the function $\#\{i:v_i \neq 0\}$ counts the number of nonzero terms in the candidate vector v. This is also termed the $l_0$-norm. Unfortunately, this problem is computationally infeasible.

Fortunately, the prominent contribution of compressed sensing literature is the observance that a convex program of minimizing an $l_1$-norm (i.e., sum of magnitudes $$\sum_{i=0}^{n-1} |v_i|),$$

instead of the infeasible $l_0$-norm, $$\min_v \|v\|_{l_1} \text{ subject to } \Phi v = \xi, \quad (22)$$

works almost as well. This linear program (also termed 'basis pursuit') can be solved using well-known iterative techniques of convex optimization, like the primal-dual algorithm.

A classical solution to such problems would be to minimize the $l_2$-norm, i.e., minimize the energy of the solution, involving the Moore-Penrose pseudo-inverse $\Phi^T(\Phi\Phi^T)^{-1}\xi$. According to the various embodiments, the sensing matrix $\Phi = W_p$ is unitary, thus the pseudo-inverse solution is reduced to $\Phi^T \xi$. However, this solution does not exploit the prior knowledge about the signal's sparsity and usually leads to poor results.

Figures 3A, 3B:
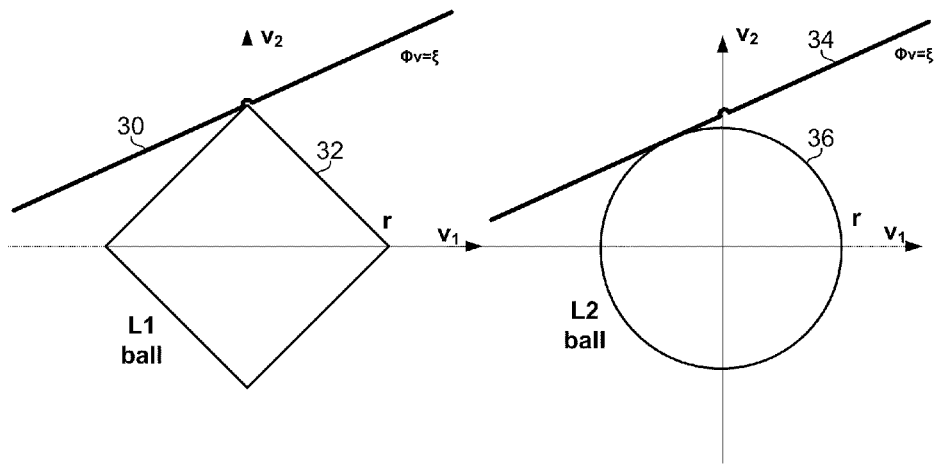
FIGS. 3A and 3B are mathematical illustrations of channel estimate solutions according to an embodiment.

In compressed sensing, the $l_1$-norm succeeds in imitating the $l_0$-norm optimization, in contrast to others such as the $l_2$-norm. FIGS. 3A and 3B show examples of these norms in a linear program with only two unknowns (i.e., n=2), $v_1$ and $v_2$, and only one measurement (m=1), $\xi_1$. FIG. 3A illustrates an $l_1$ ball in the $v_1-v_2$ plane, the anisotropy of the $l_1$ ball being 'pointy' favors the sparse solution laid on the axes. Each point within the square 32 maintains the inequality $|v_1+v_2| \leq r$, where r is the ball's 'radius', and the line 30 denotes the set of all valid solutions to the linear system, including dense solutions. The combination of the anisotropy of the $l_1$ ball and the flatness of the subspace of solutions results in an intersection occurring at one of the points along the axes, precisely where sparse signals are located. FIG. 3B illustrates an $l_2$ ball, in which the line 34 denotes the set of all valid solutions and which replaces the pointy diamond-shaped $l_1$ ball with a spherical and perfectly isotropic $l_2$ ball 36. The first point of intersection may fall at a point not on the axis, thus the solution does not have to be sparse at all and in higher dimensions the two norms can give dramatically different results.

Figure 4:
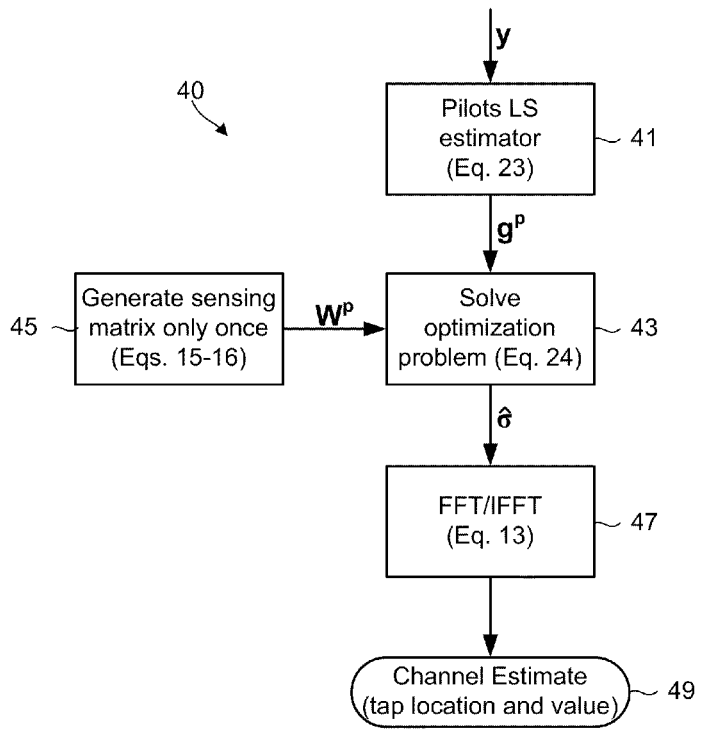
FIG. 4 is a process flow diagram of an embodiment method for calculating a channel estimate using compressed sensing.

FIG. 4 illustrates a compressed sensing channel estimation algorithm method 40 that may be accomplished by extracting the channel impulse response from the sparse representation of the doubly-selective channel (17) and applying the compressed sensing technique.

In method 40 at block 41 the p entries of the measurements vector $g^p$ of pilot signals may be determined using a one-tap LS estimator or other estimators like MMSE, $$G_{kk}^l = \frac{y_k^l}{x_k^l}, \quad (23)$$

based on the pilot subcarriers (which are preferably scattered uniformly at random as the UUP requires). The min-$l_1$ with equality constraints linear program (24) can be solved using any number of modern techniques for convex optimization. According to an embodiment, the primal-dual algorithm, may be implemented, which is one of the most standard interior-point methods for linear programming, and is implemented in practice on the real-number version of $g^p = W^p \sigma$. In an embodiment, the iterative primal-dual algorithm may be initialized with the minimum-energy solution $W^{p^T}g^p$. With an input of the sensing matrix $W^P$, which may be generated once in block 45 (see equations 15-16), in block 43, following the $l_1$-norm optimization program (22), a solution is obtained for a linear program $$\min_{\sigma}\|\sigma\|_{l_1} \text{ subject to } g^p = W^p\sigma. \quad (24)$$

While there have been many recent advances with respect to computational complexity in convex optimization for efficient solution of the linear program, the common rule of thumb for compressed sensing says that it is orders of magnitude times as expansive as solving the corresponding LS problem. Although there are many computations involved in CSCE, it should be manageable for any practical application.

The output of block 43 recovers the delay-Doppler domain channel vector $\underline{\sigma}$ which may be reassigned back into the cross-domain relation (13) in block 47 to reveal the channel impulse response (diagonal of the system matrix G). The channel impulse response then can be used to obtain the channel estimate (i.e., the tap locations and value) in block 49.

While FIG. 4 is described above in terms of method blocks, it should be appreciated that an embodiment may be implemented in circuitry in which each of blocks 41, 43, 45, 47 and 49 are circuits configured to perform the described operations, the combination of which may be implemented with an integrated receiver circuit 40. The circuit elements 41, 43, 45, 47 and 49 may be in the form of discrete circuits, or configurable or programmable circuits (e.g., a FPGA or DSP).

Often in realistic implementations of the receiver, the linear mapping of unknowns to measurements (17) is noisy due to quantization, for example. Hence instead of solving a min-$l_1$ with an equality constraints linear program, it is necessary to solve a min-$l_1$ with a quadratic constraints linear program, $$\min_{v}\|v\|_{l_1} \text{ subject to } \|\Phi v - \xi\|_2 \le \varepsilon, \quad (25)$$

where $\epsilon$ is some small error term.

Figure 5:
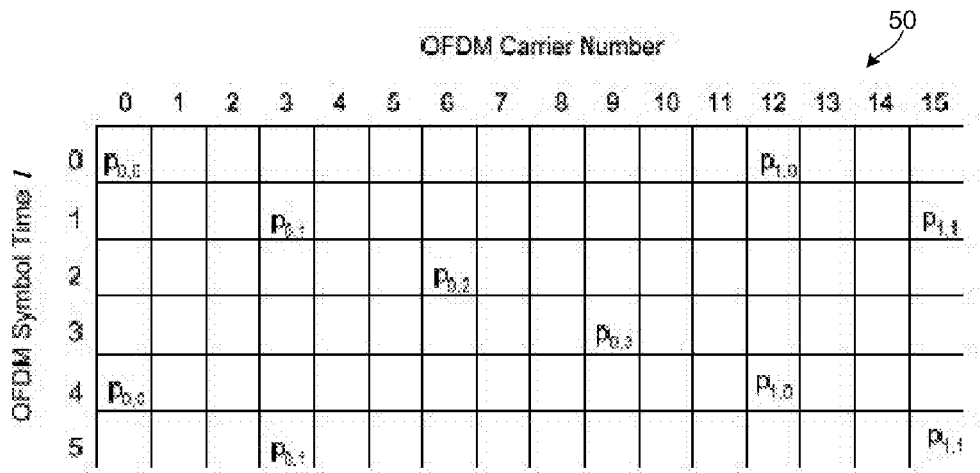
FIG. 5 is an illustration of OFDM symbols versus carrier number.

The various embodiments may apply compressed sensing channel estimation to ISDB-T mobile TV systems. The Integrated Services Digital Broadcast-Terrestrial (ISDB-T) transmission scheme, standardized by the Japanese Association of Radio Industries and Businesses (ARIB), provides broadcast coverage of TV, radio, and data services, and is the predominant broadcast standard in Japan and Brazil. The ISDB-T system uses OFDM as the transmission mechanism for the physical layer. The signal transmission spectrum has a 6 MHz bandwidth and consists of 13 consecutive OFDM segments. Each segment has a bandwidth of 428.57 kHz. The ISDB-T signal can be assigned to one of UHF channels 13-62 corresponding to center carrier frequencies of 473.142 MHz-767.142 MHz, respectively. ISDB-T defines three operational modes that can configure the physical layer to have a different number of carriers, carrier spacing, and symbol duration. For ISDB-T segment 0 (used for mobile TV), scattered pilots are transmitted according to the staggering scheme shown in FIG. 5. Referring to FIG. 5, at a given symbol time l, a pilot tone is inserted every 12 tones, with an offset of 3(l)$_4$ tones from the beginning. After four symbols the pattern repeats. In addition there are auxiliary channel (AC1) pilots and transmission and multiplexing configuration control (TMCC) pilots. These few (with respect to the number of scattered pilots) pilot tones (e.g., in mode 3 there are only 8 AC1 and 4 TMCC pilots) are located on predetermined 'random' tones and are continual (i.e., the pilots are transmitted in certain subcarriers for any symbol).

Two algorithms that have been implemented in current chipsets for ISDB-T are the CE algorithm and the CEZF algorithm.

The first phase of the CE algorithm is MMSE estimation of the three additional pilots for each transmitted pilot in the current OFDM symbol (e.g., for symbol 0 in FIG. 5, estimate the tones 3, 6 and 9 in addition to the given tone in 0). The estimation is based on 27 consecutive OFDM symbols in time. The second phase is an inverse FFT that calculates the time-domain channel response. The time-domain channel response is cleared of noise using a thresholding algorithm. The third phase is a frequency-domain response calculation including interpolation for all data subcarriers.

The CE algorithm may improve high Doppler performance for the subset of the channels that meet the following conditions: the delay between each of the two paths is not equal to T/12, 2T/12 or 3T/12, where T is the symbol duration without CP. These conditions guarantee that when interpolating the original scattered pilots only (without estimating the three additional pilots per given pilot), the real path does not fall on one of the four alias replicas. Therefore, for each of the four path locations separated by T/12, only one is a real path and three are aliases. The output time-domain response of the 27 interlaces CE algorithm, averaged by slow IIR, is used to determine which of the four hypotheses is the real path.

Figure 6:
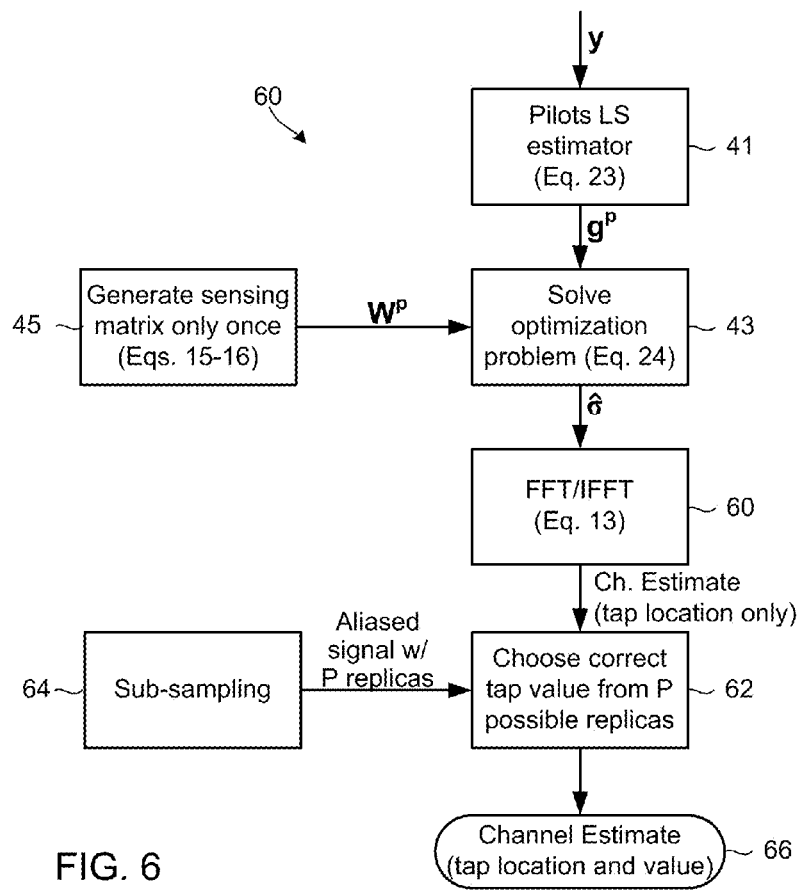
FIG. 6 is a process flow diagram of another embodiment method for calculating a channel estimate using compressed sensing.

In an embodiment method 60 illustrated in FIG. 6, the derived compressed sensing channel estimation algorithm is applied to ISDB-T. In method 60 at block 41, the pilot signals may be determined using a one-LS estimator or other estimator as described above with reference to FIG. 4 (see equation 23), to output the result $g^P$. With an input of the sensing matrix $W^P$, which may be generated once in block 45 (see equations 15-16), in block 43, following the $l_1$-norm optimization program (22), a solution is obtained for a linear program $$\min_{\sigma}\|\sigma\|_{l_1} \text{ subject to } g^p = W^p\sigma. \quad (26)$$

The output of block 43 recovers the delay-Doppler domain channel vector $\hat{\sigma}$ which may be reassigned back into the cross-domain relation (13) in block 60 to reveal the channel estimate tap locations. In block 62, these results may be used in combination with subsampling results providing alias signals with P replicas provided in block 64 to choose a correct value from the P possible replicas. These results may then be used to accomplish the channel estimate, including identifying the applications and value in block 66.

While FIG. 6 is described above in terms of method blocks, it should be appreciated that an embodiment may be implemented in circuitry in which each of blocks 41, 43, 45, 60, 62, 64 and 66 are circuits configured to perform the described operations, the combination of which may be implemented with an integrated receiver circuit 60. The circuit elements 41, 43, 45, 60, 62, 64 and 66 may be in the form of discrete circuits, or configurable or programmable circuits (e.g., a FPGA or DSP).

The performance of this algorithm for ISDB-T was examined in a mobile TV application, using a compressed sensing channel estimation algorithm in end-to-end fixed-point simulation of the ISDB-T system.

As has been discussed previously, the UUP requires random allocation of the pilot subcarriers. Unfortunately, in ISDB-T the scattered pilots are allocated uniformly (FIG. 5). Hence, the few AC1 pilots may be used to 'break' the structure of the scattered pilots allocation and add a degree of randomness to the signals. Even when taking into account the AC1 pilots, the pilot grid is not fully randomized, thus compressed sensing framework may be used to estimate the location of the paths according to an embodiment. The exact path gains may be taken from the interpolation based on the original scattered pilots only, in a manner similar to CEZF. This interpolation gives four alias replicas of the real channel response, thus using compressed sensing to resolve this inherent ambiguity. The number of required compressed sensing iterations may be significantly reduced in this embodiment method. This is illustrated in the simulation which took only five iteration rounds, by re-convoluting the known TMCC symbols with the estimated channel impulse response (via both compressed sensing channel estimation and CE), comparing it to the intercepted TMCC symbols and constantly comparing the two error measurements. However, when an alias falls on path, then the performance of compressed sensing channel estimation will reduce back to those of CE (e.g., as is the case for CEZF).

The following description concentrates in the popular mode of ISDB-T known as mode 3, however the compressed sensing channel estimation algorithm may also be applied to any of the other two modes. In mode 3, there are K=432 subcarriers. In order to achieve better spectral accuracy, the receiver in the original ISDB-T simulation handles segment 0 in addition to an excess spectrum (including parts of segment 1 on the left and segment 2 on the right) to a total of 768 subcarriers. Since a pilot subcarrier appears every 12 subcarriers, there are 64 known scattered pilots in each symbol. In order to overcome the uniform pattern of the scattered pilots and to achieve random (non-coherent) measurements, we also look at the 8 AC1 pilots located non-uniformly in the spectrum (the TMCC pilots can also be added). To model the compressed sensing channel estimation algorithm in the application of ISDB-T mode 3 where there are only 72 pilots per symbol out of a total of 768 subcarriers (~9%) blocks of 4 consecutive symbols, i.e. L=4, were used to include the 4 different pilot offsets (FIG. 5). Hence there are a total of 288 (72×4) pilot-carrying subcarriers per block, where a block is 4 symbols.

The compressed sensing channel estimation algorithm ISDB-T simulation was run with different channel estimation methods for the common typical urban channel made of 6 Rayleigh fading multipaths (a.k.a. TU6) having wide dispersion in delay and relatively strong power, as has been defined by COST 207. This channel profile has been shown in field tests to reproduce fairly well the terrestrial propagation in an urban area. Note that for TU6 in ISDB-T (with CP=T/4), the number of valuable taps is $S \cong 10$, while the filter length is C=256 (~4% sparsity). A total of 4000 symbols (~4 seconds) were simulated, while the first 1000 symbols were discarded to eliminate 'power up' effects. Simulation results for a system setup including mode 3 with CP=¼ the effective symbol duration (which is the longest CP possible in ISDB-T standard) and error-correcting code of rate ½ are included below in which the center frequency, $f_c$, is assumed to be 700 MHz (UHF band).

As mentioned above, the ICI cancellation mechanism remained unchanged in the simulations. For all investigated estimation methods the complex gains corresponding to the pilot-carrying subcarriers where computed using LS estimation (23), while the ICI cancellation mechanism was fixed to a currently implemented algorithm based on a two-term Taylor expansion of the channel transfer function. The simulation was performed with fine timing, fine frequency and windowing procedures all turned off.

Figure 7:
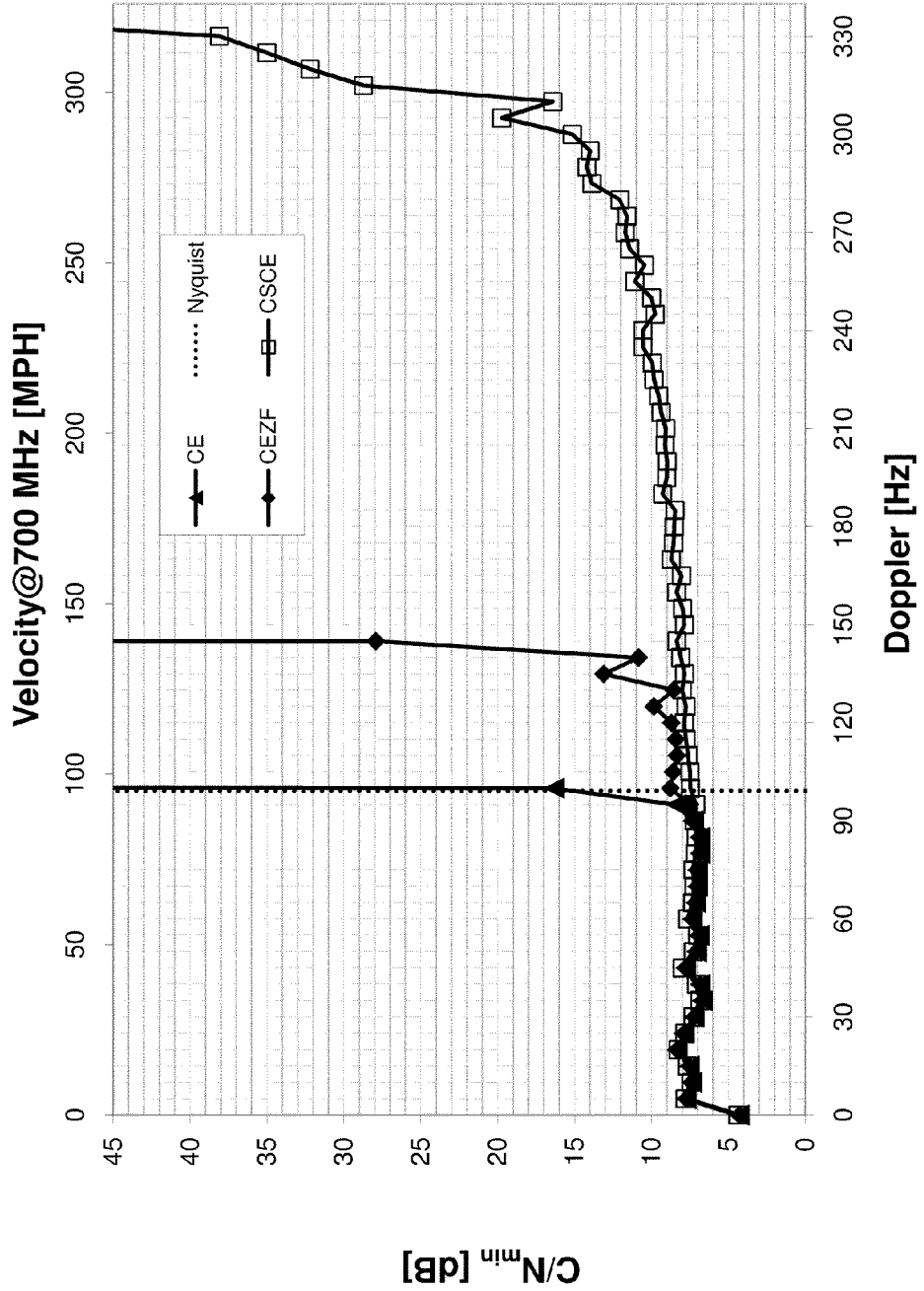
FIGS. 7-9 are plots of minimum required carrier to noise ratio (C/N) versus Doppler frequency performance of alternative embodiments for calculating channel estimates using compressed sensing.
Figure 8:
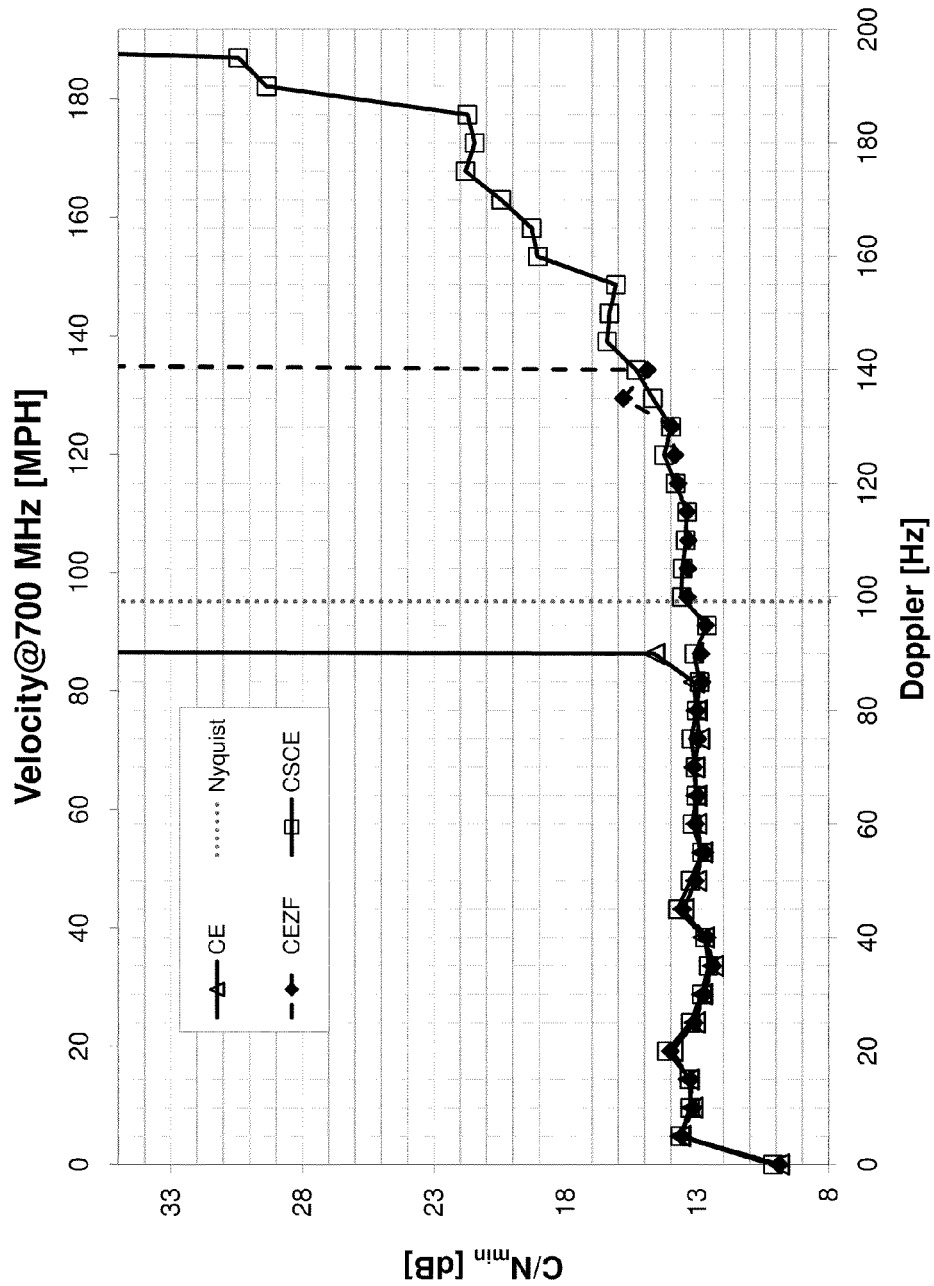

FIGS. 7 and 8 present the results of the simulation of the compressed sensing channel estimation algorithm in the form of minimal carrier-to-noise ratio, C/N, (i.e., signal-to-noise ratio), in decibels, required in order to achieve a reference bit error rate (BER) of $2 \cdot 10^{-4}$ at the output of the Viterbi decoder as a function of the Doppler spread, in Hertz. Also marked in the upper horizontal axis are the velocities, v, corresponding to the Doppler spreads $f_D = v f_c / c$, where c is the speed of light. The performance of three different channel estimation algorithms is compared: CE (marked with ▲), CEZF (♦) and compressed sensing channel estimation (■).

FIG. 7 shows the results for QPSK modulation. The region above each curve describes the working reception area under each channel estimation method. As can be seen, in the low Doppler range of up to approximately 90 Hz the three curves roughly coincide. The CE algorithm breaks down at the Doppler spread $((1.25 \cdot (T=1008 \ \mu s) \cdot 4)^{-1}/2 \cong 99$ Hz, marked with dashed vertical line) corresponding to the Nyquist bound. The CEZF algorithm operates in the intermediate range up to approximately 140 Hz. In this regime, the compressed sensing channel estimation algorithm improves CEZF in about 1 to 5 dB. In the high Doppler range, starting from 145 Hz (or equivalently 140 MPH), only compressed sensing channel estimation operates, giving reasonable error performance up to a remarkable Doppler spread of 315 Hz (i.e., around 300 MPH). Note that this maximal Doppler spread more than triples the one corresponding to the Shannon-Nyquist bound.

FIG. 8 displays the error-performance results for a similar simulation setting, except that 16-QAM modulation is used instead of QPSK modulation. Again, in the low Doppler range of up to roughly 85 Hz the examined methods give similar results. The CE algorithm fails around 90 Hz, when getting close to the Nyquist bound. The CEZF algorithm fails at approximately 140 Hz. Note that in this regime, the performance of compressed sensing channel estimation algorithm does not deteriorate in certain 'weak spots', as 135 Hz, as happens for CEZF. In the higher Doppler range, starting from 140 Hz, only the compressed sensing channel estimation algorithm is functional, up to a Doppler spread of almost 200 Hz (i.e., above 180 MPH). This maximal Doppler spread is approximately two times the Nyquist bound. Also note that 16-QAM and QPSK refer to the data modulation, while the pilot modulation is kept the same in both cases. Therefore, comparing the 16-QAM (FIG. 8) performance to that achieved for QPSK (FIG. 7), one can conclude that for 16-QAM the compressed sensing channel estimation algorithm continues to well estimate the channel even beyond the critical point of 200 Hz. However, the overall VBER performance deteriorates in this high Doppler regime due to the implemented ICI cancellation mechanism. Improving the ICI cancellation mechanism would enable better error performance to be achieved.

Figure 9:
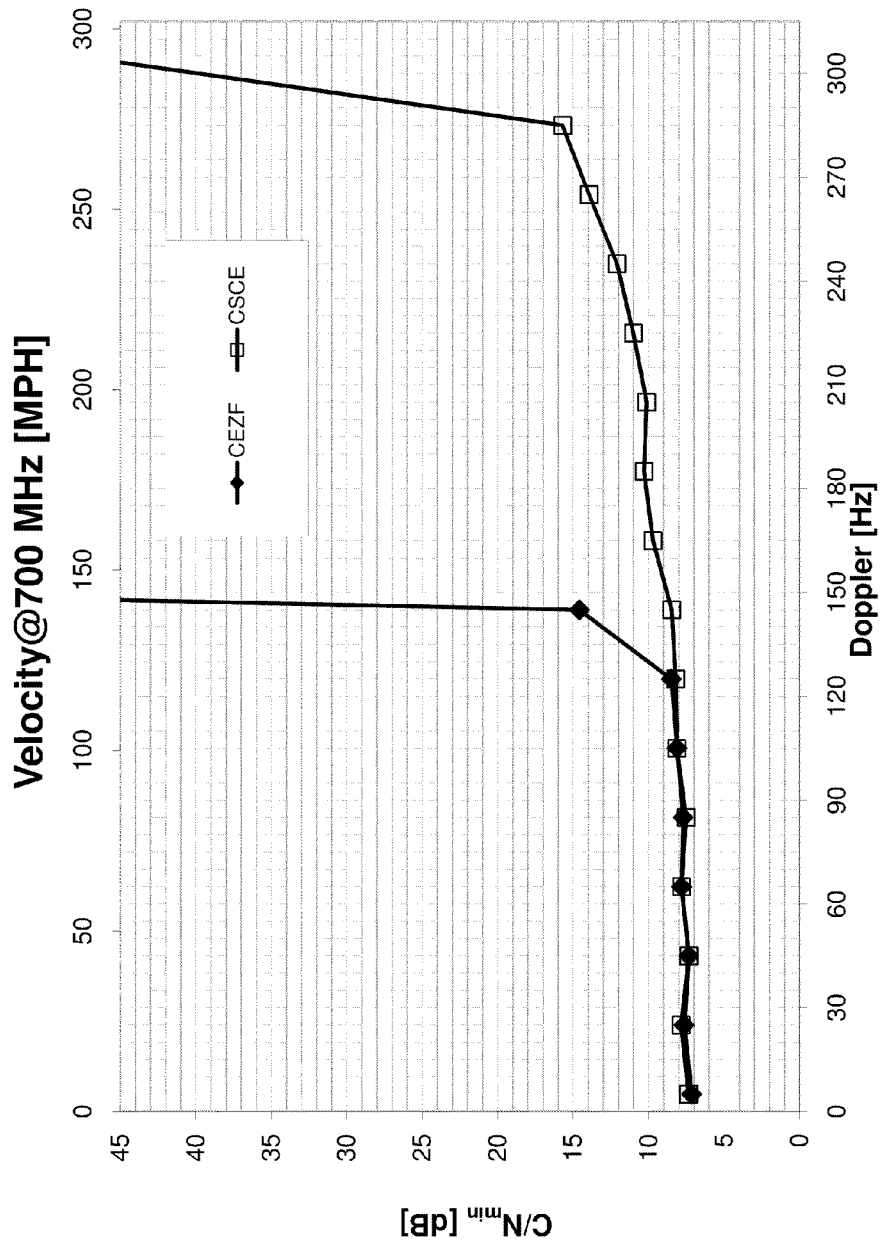

FIG. 9 shows the error performance for a setup similar to the one in FIG. 7, except that the simulated channel is what is known as the long-strong echo mobile SFN (single frequency network) channel. This profile consists of two independent TU6 channels separated in time by 90% of the longest used CP (=¼). The purpose of this channel profile is mainly to test receiver performance in SFN mobile conditions. The two groups of paths are simulated signals from two distant transmitters. As can be observed, the superior performance of the compressed sensing channel estimation algorithm (290 MPH) over CEZF (145 MPH) is maintained to roughly the same extend. The inferior CE curve is omitted from FIG. 9.

It is conjectured in compressed sensing literature as a "rule of thumb" that every nonzero tap in a sparse signal requires roughly 4 measurements in order to reconstruct the entire signal. In simulated ISDB-T transmission, there were 72 measurements per symbol. Based upon the rule of thumb, the compressed sensing channel estimation algorithm should be able to recover signals with 72/4=18 nonzero taps (~7% sparsity). The compressed sensing channel estimation algorithm seems to perform well even above this empirical '1 tap-4 measurements' guideline.

If the number of nonzero channel taps is increased, at some point the channel impulse response ceases to be sparse, and the number of measurements becomes close to or even lower than the number of nonzero taps. In order to be able to deal with such cases it may be necessary to serially concatenate the compressed sensing channel estimation algorithm and CEZF. This was demonstrated in a simulation of a channel profile consisting of five TU6 path chunks being uniformly located over the effective symbol length. In this simulation there were about 50 nonzero taps. Hence, the number of measurements (72) was comparable to the number of measurements and the channel filter itself is not so sparse (~25% nonzero taps). It was found that taking the compressed sensing channel estimation output as the input to the CEZF algorithm yielded an error performance similar to CEZF is (e.g., for 16-QAM the maximal Doppler spread is 140 Hz).

Generally speaking, the compressed sensing channel estimation algorithm can reduce the number of pilot-carrying subcarriers in a particular signal while maintaining a given error rate, which increases the data throughput rate of the signal. While the error rate in such a signal processed using compressed sensing channel estimation would remain acceptable, such an improvement in data throughput would come at the expense of decreasing the error performance of receivers using interpolation methods based on Shannon-Nyquist sampling theory.

Figure 10:
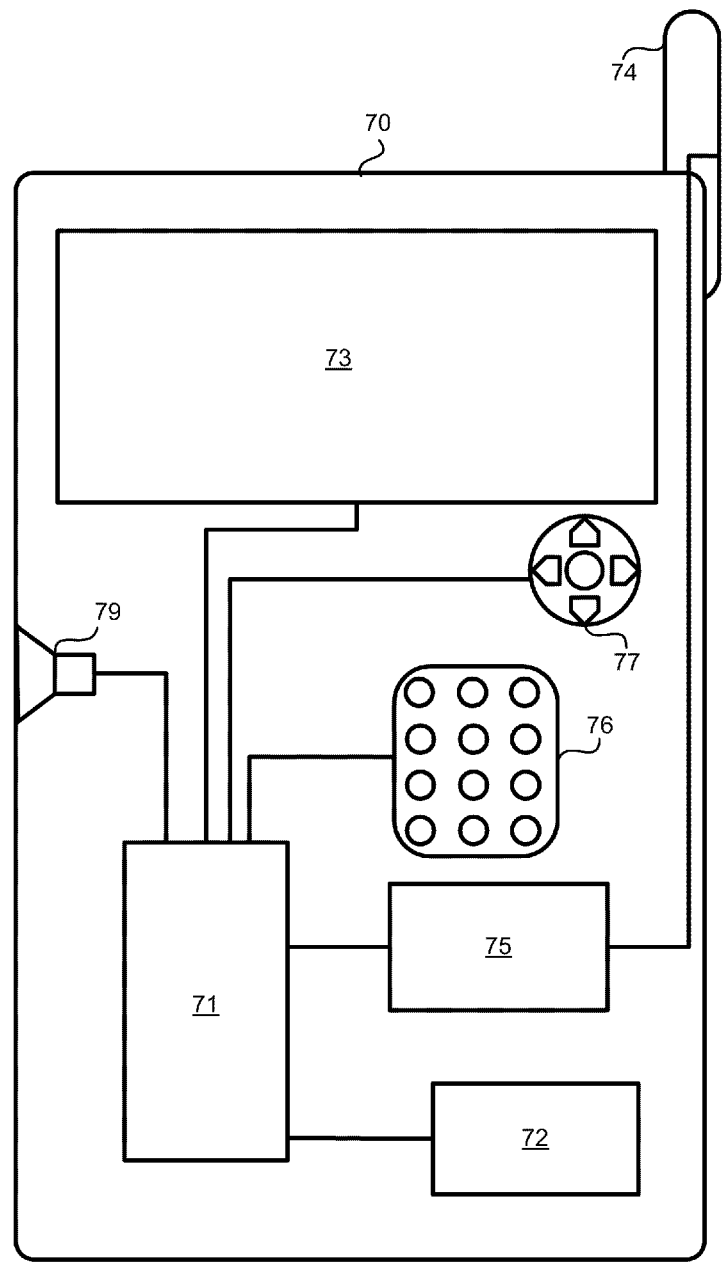
FIG. 10 is a component block diagram of a communication device suitable for use in an embodiment.

The various embodiments may be implemented on a wide variety of wireless communication devices. Typical wireless communication devices 70 suitable for use with the various embodiments will have in common the components illustrated in FIG. 10. For example, an exemplary wireless receiver 70 may include a processor 71 coupled to internal memory 72, a display 73, and to a speaker 79. Additionally, the wireless receiver 70 may have an antenna 74 for receiving electromagnetic radiation that is connected to a wireless data link transceiver 75 coupled to the processor 71. Wireless receivers 70 typically also include a key pad 76 or miniature keyboard and menu selection buttons or rocker switches 77 for receiving user inputs.

The processor 71 may be any programmable microprocessor, microcomputer or multiple processor chip or chips that can be configured by software instructions (applications) to perform a variety of functions, including the functions of the various embodiments described herein. In some mobile devices, multiple processors 71 may be provided, such as one processor dedicated to wireless communication functions and one processor dedicated to running other applications. Typically, software applications may be stored in the internal memory 72 before they are accessed and loaded into the processor 71. In some mobile devices, the processor 71 may include internal memory sufficient to store the application software instructions. In many wireless receivers 70, the internal memory 72 may be a volatile or nonvolatile memory, such as flash memory, or a mixture of both. For the purposes of this description, a general reference to memory refers to all memory accessible by the processor 71, including internal memory 72, removable memory plugged into the wireless receiver 70, and memory within the processor 71 itself.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for receiving a wireless Orthogonal Frequency Division Multiplexing (OFDM) signals, comprising: obtaining a channel estimate by performing compressed sensing channel estimation on an OFDM signal reconstructed as a sparse signal in a delay-Doppler domain, wherein at least some pilot subcarriers of the OFDM signal are uniformly allocated at a specific interval, wherein obtaining a channel estimate by performing compressed sensing channel estimation comprises: obtaining pilot signals $g^P$ from the channel using a least-squares estimator; and using the obtained pilot signals to recover a delay-Doppler domain channel vector $\hat{\sigma}$ by solving the following optimization problem:

$$\min_{\sigma} \|\sigma\|_{l_1} \text{ subject to } g^P = W^P \sigma,$$

wherein $\sigma$ is a vector in the delay-Doppler domain, wherein $W^P$ is a sensing matrix, wherein $\|\sigma\|_{l_1}$ is a $l_1$-norm of the vector $\sigma$ in the delay-Doppler domain; and determining a correct tap value from a plurality of replicas, based on a combination of sub sampling results providing alias signals with the plurality of replicas and channel estimate tap locations.

2. The method of claim 1, further comprising reassigning the recovered delay-Doppler domain channel vector $\hat{\sigma}$ into a cross-domain relation to reveal channel estimate tap locations.

3. The method of claim 1, wherein the OFDM wireless signals comprise Integrated Services Digital Broadcast-Terrestrial LISDB-T) signals.

4. The method of claim 1, further comprising utilizing a plurality of auxiliary channel (AC1) pilots to randomize the OFDM signal, wherein the number of the plurality of AC1 pilots is less than the number of the channel estimate tap locations.

5. A receiver circuit configured to receive wireless Orthogonal Frequency Division Multiplexing (OFDM) signals, comprising: a first processing circuit configured to reconstruct an OFDM signal as a sparse signal in a delay-Doppler domain, wherein at least some pilot subcarriers of the OFDM signal are allocated uniformly at a specific interval; a second processing circuit configured to obtain a channel estimate using compressed sensing channel estimation, wherein the second processing circuit configured to obtain a channel estimate by performing compressed sensing channel estimation comprises: a third processing circuit configure to obtain pilot signals $g^P$ from a channel using a least-squares estimator; and a fourth processing circuit configured to use the obtained pilot signals to recover a delay-Doppler domain channel vector $\hat{\sigma}$ by solving the following optimization problem:

$$\min_{\sigma} \|\sigma\|_{l_1} \text{ subject to } g^P = W^P \sigma,$$

wherein $\sigma$ is a vector in the delay-Doppler domain, wherein $W^P$ is a sensing matrix, wherein $\|\sigma\|_{l_1}$ is a $l_1$-norm of the vector $\sigma$ in the delay-Doppler domain; and a fifth processing circuit configured to determine a correct tap value from a plurality of replicas, based on a combination of subsampling results providing alias signals with the plurality of replicas and channel estimate tap locations.

6. The receiver circuit of claim 5, further comprising a sixth processing circuit configured to reassign the recovered delay-Doppler domain channel vector $\hat{\sigma}$ into a cross-domain relation to reveal channel estimate tap locations.

7. The receiver circuit of claim 5, wherein the receiver circuit is configured to receive Integrated Services Digital Broadcast-Terrestrial (ISDB-T) signals.

8. The receiver circuit of claim 5, further comprising a sixth processing circuit configured to utilize a plurality of auxiliary channel (AC1) pilots to randomize the OFDM signal, wherein the number of the plurality of AC1 pilots is less than the number of the channel estimate tap locations.

9. A receiver circuit configured to receive wireless Orthogonal Frequency Division Multiplexing (OFDM) signals, comprising: means for reconstructing an OFDM signal as a sparse signal in a delay-Doppler domain, wherein at least some pilot subcarriers of the OFDM signal are distributed uniformly at a specific interval; means for obtaining a channel estimate by performing compressed sensing channel estimation on the sparse signal in the delay-Doppler domain, wherein means for obtaining a channel estimate by performing compressed sensing channel estimation comprises: means for obtaining pilot signals $g^P$ from a channel using a least-squares estimator; and means for using the obtained pilot signals to recover a delay-Doppler domain channel vector $\hat{\sigma}$ by solving the following optimization problem:

$$\min_{\sigma} \|\sigma\|_{l_1} \text{ subject to } g^P = W^P \sigma,$$

wherein $\sigma$ is a vector in the delay-Doppler domain, wherein $w^P$ is a sensing matrix, wherein $\|\sigma\|_{l_1}$ is a $l_1$-norm of the vector $\sigma$ in the delay-Doppler domain; and means for determining a correct tap value from a plurality of replicas, based on a combination of subsampling results providing alias signals with the plurality of replicas and channel estimate tap locations.

10. The receiver circuit of claim 9, further comprising means for reassigning the recovered delay-Doppler domain channel vector $\hat{\sigma}$ into a cross-domain relation to reveal channel estimate tap locations.

11. The receiver circuit of claim 9, wherein the receiver circuit is configured to receive Integrated Services Digital Broadcast-Terrestrial (ISDB-T) signals.

12. The receiver circuit of claim 9, further comprising means for utilizing a plurality of auxiliary channel (AC1) pilots to randomize the OFDM signal, wherein the number of the plurality of AC1 pilots is less than the number of the tap locations.

13. A communication device configured to receive wireless Orthogonal Frequency Division Multiplexing (OFDM) signals, comprising: a wireless receiver circuit configured to obtain a channel estimate by performing compressed sensing channel estimation on an OFDM signal reconstructed as a sparse signal in a delay-Doppler domain, wherein at least some of the pilot subcarriers of the OFDM signal are uniformly distributed at a specific interval, wherein the wireless receiver circuit is configured to obtain a channel estimate by performing compressed sensing channel estimation comprises: a first processing circuit configure to obtain pilot signals $g^P$ from a channel using a least-squares estimator; and a second processing circuit configured to use the obtained pilot signals to recover a delay-Doppler domain channel vector $\hat{\sigma}$ by solving the following optimization problem:

$$\min_{\sigma} \|\sigma\|_{l_1} \text{ subject to } g^P = W^P \sigma,$$

wherein $\sigma$ is a vector in the delay-Doppler domain, wherein $w^P$ is a sensing matrix, wherein $\|\sigma\|_{l_1}$ is a $l_1$-norm of the vector $\sigma$ in the delay-Doppler domain; and a processing circuit configured to determine a correct tap value from a plurality of replicas, based on a combination of subsampling results providing alias signals with the plurality of replicas and channel estimate tap locations.

14. The communication device of claim 13, further comprising a third processing circuit configured to reassign the recovered delay-Doppler domain channel vector $\hat{\sigma}$ into a cross-domain relation to reveal channel estimate tap locations.

15. The communication device of claim 13, wherein the wireless receiver circuit is configured to receive Integrated Services Digital Broadcast-Terrestrial (ISDB-T) signals.

16. The communication device of claim 13, further comprising a fourth processing circuit configured to utilize a plurality of auxiliary channel (AC1) pilots to randomize the OFDM signal, wherein the number of the plurality of AC1 pilots is less than the number of the tap locations.

17. A communication device configured to receive wireless Orthogonal Frequency Division Multiplexing (OFDM) signals, comprising: means for obtaining a channel estimate by performing compressed sensing channel estimation on an OFDM signal reconstructed as a sparse signal in a delay-Doppler domain, wherein at least some of the pilot subcarriers of the OFDM signal are uniformly allocated at a specific interval, wherein means for obtaining a channel estimate by performing compressed sensing channel estimation comprises: means for obtaining pilot signals $g^P$ from a channel using a least-squares estimator; and means for using the obtained pilot signals to recover a delay-Doppler domain channel vector $\hat{\sigma}$ solving the following optimization problem:

$$\min_{\sigma} \|\sigma\|_{l_1} \text{ subject to } g^P = W^P \sigma,$$

wherein $\sigma$ is a vector in the delay-Doppler domain, wherein $w^P$ is a sensing matrix, wherein $\|\sigma\|_{l_1}$ is a $l_1$-norm of the vector $\sigma$ in the delay-Doppler domain; and means for determining a correct tap value from a plurality of replicas, based on a combination of subsampling results providing alias signals with the plurality of replicas and channel estimate tap locations.

18. The communication device of claim 17, further comprising means for realigning reassigning the recovered delay-Doppler domain channel vector $\hat{\sigma}$ into a cross-domain relation to reveal channel estimate tap locations.

19. The communication device of claim 17, wherein the OFDM signals comprise Integrated Services Digital Broadcast-Terrestrial (ISDB-T) signals.

20. The communication device of claim 17, further comprising means for utilizing a plurality of auxiliary channel (AC1) pilots to randomize the OFDM signal, wherein the number of the plurality of AC1 pilots is less than the number of the tap locations.

21. A non-transitory processor-readable storage medium having stored thereon digital signal processor-executable instructions, which when executed by a digital signal processor, perform operations comprising: obtaining a channel estimate on a wireless Orthogonal Frequency Division Multiplexing (OFDM) signal by performing compressed sensing channel estimation on an OFDM signal reconstructed as a sparse signal in a delay-Doppler domain, wherein at least some of the pilot subcarriers of the OFDM signal are uniformly allocated uniformly at a specific interval, wherein obtaining a channel estimation by performing compressed sensing channel estimation comprises: obtaining pilot signals $g^P$ from the channel using a least-squares estimator; and using the obtained pilot signals to recover a delay-Doppler domain channel vector $\hat{\sigma}$ by solving the following optimization problem:

$$\min_{\sigma} \|\sigma\|_{l_1} \text{ subject to } g^P = W^P \sigma,$$

wherein $\sigma$ is a vector in the delay-Doppler domain, wherein $w^P$ is a sensing matrix, wherein $\|\sigma\|_{l_1}$ is a $l_1$-norm of the vector $\sigma$ in the delay-Doppler domain; and determining a correct tap value from a plurality of replicas, based on a combination of sub sampling results providing alias signals with the plurality of replicas and channel estimate tap locations.

22. The non-transitory processor-readable storage medium of claim 21, wherein the operations further comprise reassigning the recovered delay-Doppler domain channel vector $\hat{\sigma}$ into a cross-domain relation to reveal channel estimate tap locations.

23. The non-transitory processor-readable storage medium of claim 21, wherein the OFDM wireless signals comprise Integrated Services Digital Broadcast-Terrestrial (ISDB-T) signals.

24. The non-transitory processor-readable storage medium of claim 21, wherein the operations further comprises utilizing a plurality of auxiliary channel (AC1) pilots to randomize the OFDM signal, wherein the number of the plurality of AC1 pilots is less than the number of the tap locations.

* * * * *